F. C. STEVENS.
MEASURING DEVICE.
APPLICATION FILED DEC. 26, 1919.
1,378,572.
Patented May 17, 1921
3 SHEETS—SHEET 1.
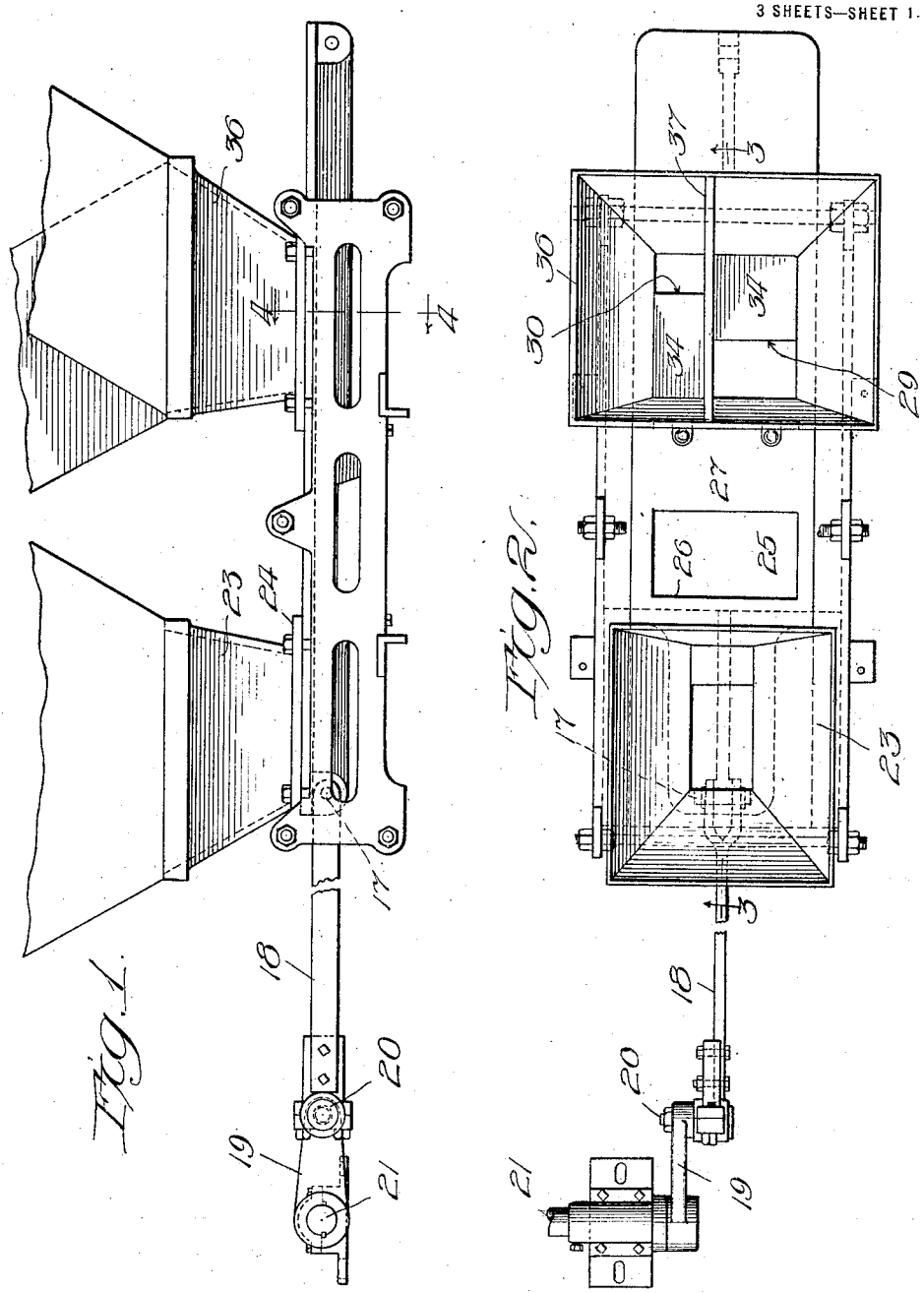
WITNESSES:
Harry S. Gaither
INVENTOR
Fremont C. Stevens
BY
ATTORNEYS

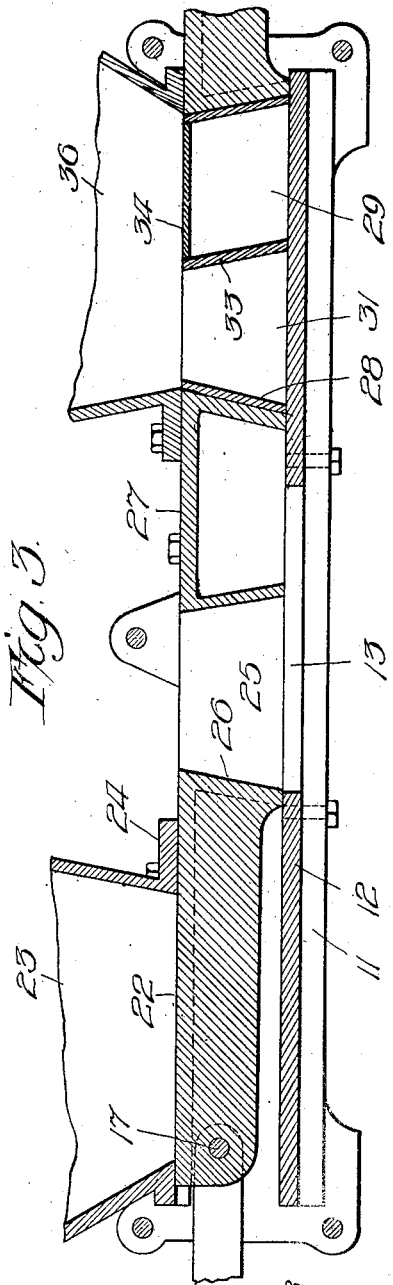
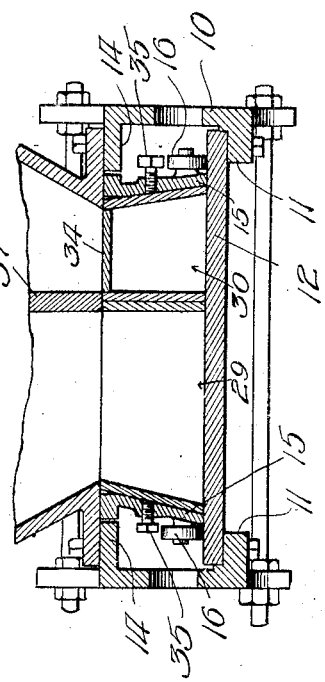

F. C. STEVENS.
MEASURING DEVICE.
APPLICATION FILED DEC. 26, 1919.
1,378,572.
Patented May 17, 1921.
3 SHEETS—SHEET 3.
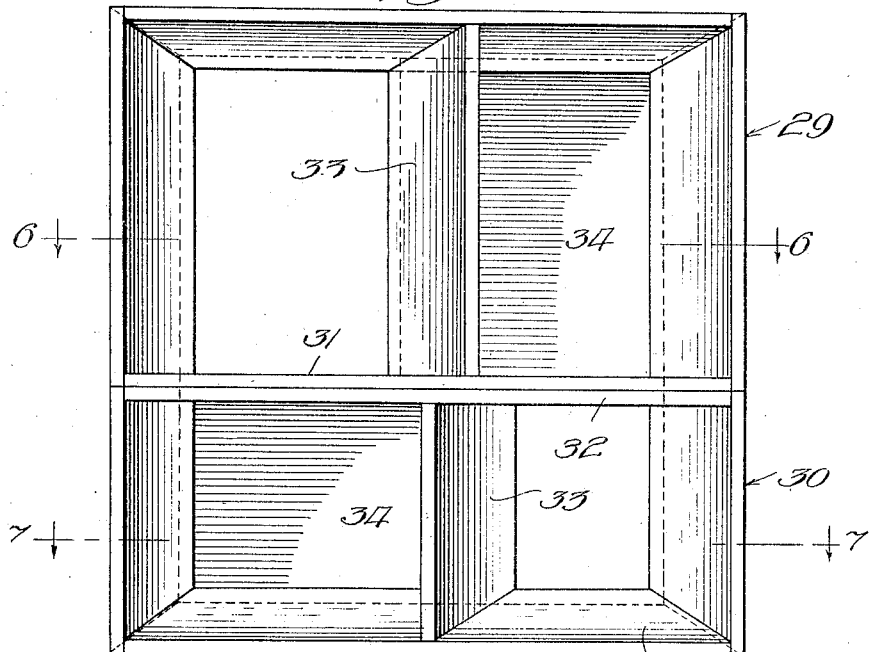
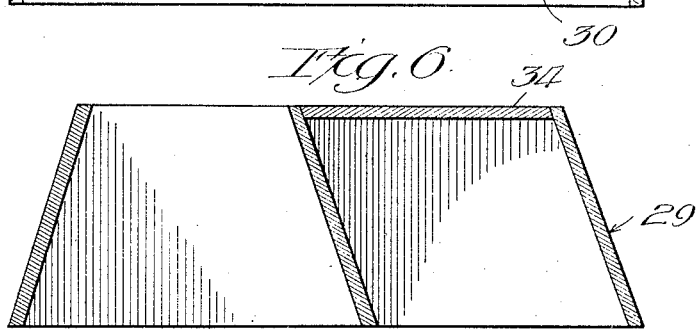
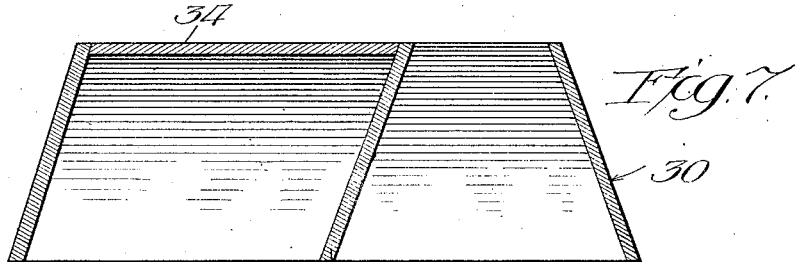
WITNESSES:
Harry S. Gaither
INVENTOR
Fremont C. Stevens
BY
ATTORNEYS

UNITED STATES PATENT OFFICE.

FREMONT C. STEVENS, OF CHICAGO, ILLINOIS, ASSIGNOR TO AMERICAN BUILDING PRODUCTS COMPANY, OF CHICAGO, ILLINOIS, A CORPORATION OF DELAWARE.

MEASURING DEVICE.

1,378,572.	Specification of Letters Patent.	Patented May 17, 1921.

Application filed December 26, 1919. Serial No. 347,321.

*To all whom it may concern:*

Be it known that I, FREMONT C. STEVENS, a citizen of the United States, residing at Chicago, in the county of Cook and State of Illinois, have invented certain new and useful Improvements in Measuring Devices, of which the following is a specification.

This invention relates to a device adapted to receive from a hopper loose materials in measured quantities preliminary to mixing the same for a specific purpose. It may be used with advantage in the making of such products as bricks, or other commodities which require the combining together of different materials in certain definite proportions.

The parts that are novel to this invention include a machine which is operatively related to one or more hoppers containing the materials to be measured, and to any suitable mechanism for mixing together the materials so measured and delivered at a given rate. It is accordingly an object of this invention to combine and arrange the various parts so that they may be easily assembled in a single machine; that they may be readily adjusted according to various requirements; and that they be removable therefrom for purposes of repair or substitution. My invention consists also in numerous other features all of which will appear from the specification and claims to follow, and from the accompanying drawings which exhibit an exemplification of this invention in the manner following:

Figure 1 is a fragmentary side elevation showing the essential parts of a machine adapted to coöperate with the measuring device;

Fig. 2 is a plan view thereof;

Fig. 3 is an enlarged detail in longitudinal section, taken on line 3—3 of Fig. 2;

Fig. 4 is an enlarged transverse section taken on line 4—4 of Fig. 1;

Fig. 5 is a view from the under side of two measuring units arranged operatively side by side; and Figs. 6 and 7 are longitudinal sectional views therethrough taken, respectively, on lines 6—6 and 7—7 of Fig. 5.

A machine that is adapted to coöperate with the parts that are novel to this invention may be suitably constructed with side plates 10 inwardly turned at their bottom edges, as at 11, to provide flanges on which is supported a base plate 12 having a discharge opening 13, as best shown in Figs. 2 and 4. The upper edge of each side plate is inwardly turned to provide a flange 14, the construction being such that a guideway is formed within which may move a carriage 15, whose upper portions abut the flanges 14 so as to confine the carriage to straight-line movements. This carriage is preferably mounted upon rollers 16 which are adapted to travel adjacent the sides of the base plate 12 when the machine is in operation. To one end of the carriage a pivotal connection is made, as at 17, with a pitman 18 that may be reciprocated through the medium of a crank 19 to which it is connected as at 20, the crank being driven by power which is supplied to a shaft 21 on which the crank is carried.

The carriage that is used in this machine is specially constructed to provide a flat upper surface in which are certain openings arranged according to their location with respect to the coöperating mechanisms. At the end which is proximate to the pitman the upper surface of the carriage presents a blank or solid portion 22 which at one end of the stroke of the crank 19, as shown in Figs. 1 and 3, underlies a hopper 23 containing one kind of loose material to be measured. This hopper, it should be noted, is formed at its base with ears or flanges 24 which rest upon and are secured to the upper flanges 14 of the side plates 10. Adjacent this blank portion 22 of the carriage is an opening 25 adapted to underlie the hopper 23 when the carriage is at the end of its opposite stroke. This opening extends downwardly through the carriage in the form of a compartment, being bounded by walls 26, which preferably diverge from its top to the bottom side thereof, the bottom of the compartment being covered by the base plate 12 when its top lies below the hopper 23. According to this construction, material may pass from the hopper into the compartment to the extent of its capacity, and no more. With reciprocation of the carriage, this compartment is moved out from beneath the hopper, its place being taken by the blank surface 22 which prevents further discharge of material. At the end of its stroke, the parts will be related as shown in Fig. 3, where the compartment overlies the discharge opening 13 in the bed plate 12, so that only the material contained within that compartment may pass therethrough into any suitable mixing apparatus that may be used in connection with this machine. In this manner the quantity of material passing from the hopper 23 into the mixing apparatus may be definitely regulated.

On the side of the compartment which is longitudinally opposite the blank surface 22 is a second blank or solid portion 27 beyond which is another compartment 28 adapted to receive one or more measuring units designated as 29 and 30. In construction, these units are in the form of boxes, as appears best in Figs. 5 to 7 inclusive, wherein it is shown that the box 29 is provided with one substantially vertical wall 31 adapted to abut a similar wall 32 formed on the box 30, both of which are disposed longitudinally of the machine. The other walls of these boxes are preferably inclined from top to bottom so that, while the contour of the upper and lower edges remains rectangular, the upper is the smaller. Interiorly each box may be divided as by means of a partition plate wall 33 so as to form two compartments, the size of which may be determined according to the requirements of the materials to be measured. One of these compartments in each box is closed on its upper side as by means of a wall 34, the effect being to leave the other compartment open both at the top and bottom, the walls surrounding this opening diverging toward the bottom. As already stated, these units or boxes, either two or any other number of them, are adapted to be received within the carriage compartment 28, and to be therein removably secured as by means of set-screws 35 (see Fig. 4). In operative relation to these several units is a hopper 36 longitudinally divided as by means of a partition 37 so as to receive in each of its compartments different materials, selected according to the use to which the machine is put. This hopper partition is alined with the two walls 31 and 32 so that the several materials contained within the hopper 36 are guided only into the proper units 29 and 30, and not elsewhere. When the carriage is in the position indicated in Fig. 3, both units are in underlying relation to the hopper 36, so as to receive charges of the material, the amount whereof is determined by the capacity of the open compartment in each box. In order that the present machine may be accommodated to different conditions, units may be provided each having compartments of a desired capacity, and proper substitution thereof made for each change required in the proportion of the materials to be used. This may be readily accomplished by removably securing the units in the carriage in the manner already explained, the boxes being withdrawn and replaced through the discharge opening 13.

In the operation of the machine, the carriage is reciprocated back and forth over the bed plate, charges of material being received alternately from the hoppers 23 and 36, the one dumping into the carriage compartment 23 and the other into the units 29 and 30 that are contained within the carriage compartment 28. Through the discharge opening 13 passes a definite quantity of different materials measured according to the capacity of the compartment 25 and units 29 and 30, this discharging operation occurring in part with each reciprocating stroke of the carriage. It will accordingly be apparent that the machine of the present invention is adapted to measure out definite quantities of several different materials while in transit between the hoppers and mixing device that may be employed to receive them.

I claim:

1. In a device of the kind described, the combination of a guideway formed with spaced parallel side plates whose upper and lower edges are inturned to provide flanges, a bed plate supported on the lower flanges of the side plates and having a central discharge opening, a carriage adapted to be reciprocated within the guideway mounted on rollers which travel adjacent the sides of the bed plate, the upper sides of the carriage being formed to provide blank surfaces and openings therebetween from each of which depend walls to provide a compartment having a definite cubical capacity, the lower edges of said walls terminating adjacent the bed plate to prevent escape of loose material from each compartment except when the same is in register with the discharge opening in the bed plate, and a plurality of hoppers mounted on the guideway having means for discharging from each hopper loose material into one of the carriage compartments only when the carriage is properly positioned thereunder, and means for reciprocating the carriage whereby materials are discharged in measured quantities first from one hopper and then from another into different carriage compartments preliminary to a subsequent discharge through the bed plate opening, substantially as described.

2. In a device of the kind described, the combination with a movable carriage, of means for guiding the carriage in a definite course, means for imparting movement to the carriage, a plurality of hoppers arranged immediately above the carriage each having a discharge opening adjacent thereto, the upper side of the carriage being formed with a plurality of blank portions with compartments therein, each adapted to receive a definite quantity of material from one of the hoppers when positioned therebelow, a measuring unit arranged in one of the carriage compartments, means for removably securing said unit in place, the unit being in the form of a box opened at its top and bottom and having capacity to receive a definite quantity of material therein only when it is positioned beneath a particular hopper, and a bed plate immediately adjacent the lower side of each carriage compartment adapted to prevent escape of material therefrom while material is passing thereinto from the hoppers, said bed plate being formed with a discharge opening over which the carriage may travel to discharge successively material contained within its several compartments, substantially as described.

3. In a device of the kind described, the combination with a hopper having a partition to provide separate compartments therein, of a carriage adapted to travel below the hopper in the direction of said partition, the carriage being formed with a compartment adapted to underlie both of the hopper compartments, a bed plate immediately below the carriage for preventing escape of material received within its compartment, and a plurality of measuring units removably positioned within the carriage compartment with their adjoining walls alined with the partition in the hopper whereby each hopper compartment is in register with one unit in the carriage to thereby discharge a definite quantity of material thereinto, substantially as described.

4. In a device of the kind described, the combination with a plurality of hoppers, of a carriage movable below each of said hoppers, the carriage being formed with a plurality of compartments, each of which is adapted to receive material from a single hopper, a partition arranged within one hopper in the direction of movement of the carriage, and two units contained in one of the carriage compartments adapted to receive material from said hopper, the units being separated from each other by walls which aline with the partition in said hopper, each of said units being in the form of a box having a desired capacity to receive from its associated hopper a measured quantity of material, and means for preventing discharge of the material from each of the carriage compartments except when the carriage is moved to a predetermined position, substantially as described.

FREMONT C. STEVENS.